United States Patent
Agiwal et al.

(10) Patent No.: US 10,638,455 B2
(45) Date of Patent: Apr. 28, 2020

(54) SYSTEM AND METHOD OF LOGICAL CHANNEL PRIORITIZATION FOR D2D COMMUNICATION

(71) Applicant: Samsung Electronics Co., Ltd., Suwon-si, Gyeonggi-do (KR)

(72) Inventors: Anil Agiwal, Suwon-si (KR); Gert Jan Van Lieshout, Apeldoorn (NL)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/484,769

(22) Filed: Apr. 11, 2017

(65) Prior Publication Data

US 2017/0295559 A1 Oct. 12, 2017

Related U.S. Application Data

(60) Provisional application No. 62/320,928, filed on Apr. 11, 2016.

(51) Int. Cl.
*H04W 72/02* (2009.01)
*H04W 72/14* (2009.01)

(52) U.S. Cl.
CPC ........... *H04W 72/02* (2013.01); *H04W 72/14* (2013.01)

(58) Field of Classification Search
CPC ..... H04W 92/18; H04W 76/14; H04W 76/23; H04W 72/02; H04W 72/04; H04W 4/40; H04W 4/46; H04L 5/0037
See application file for complete search history.

(56) References Cited

U.S. PATENT DOCUMENTS

2015/0305080 A1   10/2015   Xu et al.
2017/0048903 A1*   2/2017   Yi .................... H04W 72/02
(Continued)

FOREIGN PATENT DOCUMENTS

KR   10-2016-0118157 A   10/2016
WO   2015/169464 A1      11/2015
WO   2016/022849 A1       2/2016

OTHER PUBLICATIONS

Huawei, et al; "Discussion on sidelink logical channel prioritization", Apr. 2, 2016 (publicly available on the server); R2-162170, 3GPP TSG-RAN WG2 Meeting #93bis. (Year: 2016).*

(Continued)

*Primary Examiner* — Robert C Scheibel
(74) *Attorney, Agent, or Firm* — Jefferson IP Law, LLP (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The method for allocating resource by a user equipment (UE) comprises identifying at least one sidelink logical channel not previously selected for a first sidelink control (SC) period and a second SC period, wherein the second SC period is overlapping in time with the first SC period, and allocating resource to the at least one sidelink logical channel.

8 Claims, 7 Drawing Sheets

(56) References Cited

U.S. PATENT DOCUMENTS

| | | |
|---|---|---|
| 2017/0064534 A1 | 3/2017 | Loehr et al. |
| 2017/0230939 A1 | 8/2017 | Rudolf et al. |
| 2017/0257876 A1* | 9/2017 | Loehr .................. H04L 5/0044 |
| 2018/0110054 A1* | 4/2018 | Jung .................... H04W 72/02 |

OTHER PUBLICATIONS

Huawei, Discussion on Sidelink Logical Channel Prioritization, 3GPP TSG-RAN WG2 Meeting #93bis, Apr. 11-15, 2016, R2-162170, Dubrovnik.

3rd Generation Partnership Project; Technical Specification Group Radio Access Network; Evolved Universal Terrestrial Radio Access (E-UTRA); Medium Access Control (MAC) protocol specification (Release 13), 3GPP TS 36.321, Mar. 2016, V13.1.0, Sophia Antipolis, France.

International Search Report dated Jul. 18, 2017, issued in the International Application No. PCT/KR2017/003903.

\* cited by examiner

SYSTEM AND METHOD OF LOGICAL CHANNEL PRIORITIZATION FOR D2D COMMUNICATION

CROSS-REFERENCE TO RELATED APPLICATION

This application claims the benefit under 35 U.S.C. § 119(e) of a U.S. Provisional application filed on Apr. 11, 2016 in the U.S. Patent and Trademark Office and assigned Ser. No. 62/320,928, the entire disclosure of which is hereby incorporated by reference.

TECHNICAL FIELD

The present disclosure relates to a device to device (D2D), vehicle to vehicle (V2V), vehicle to pedestrian (V2P), or pedestrian to vehicle (P2V) communication, in particular, the present disclosure relates to an apparatus and method of logical channel prioritization for D2D Communication.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), device to device (D2D) communication, vehicle to vehicle (V2V) communication, vehicle to pedestrian (V2P) communication, pedestrian to vehicle (P2V) communication and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the present disclosure. No determination has been made, and no assertion is made, as to whether any of the above might be applicable as prior art with regard to the present disclosure.

DISCLOSURE

Technical Problem

When allocating resources to logical channel in a sidelink communication, an enhanced logical channel prioritization procedure (LCP) by a user equipment (UE) is needed.

Technical Solution

Aspects of the present disclosure are to address at least the above-mentioned problems and/or disadvantages and to provide at least the advantages described below.

In one embodiment of the proposed invention, there is a method for allocating resource by a user equipment (UE), the method comprising: identifying at least one sidelink logical channel not previously selected for a first sidelink control (SC) period and a second SC period, wherein the second SC period is overlapping in time with the first SC period, and allocating resource to the at least one sidelink logical channel.

In one embodiment of the proposed invention, there is a user equipment (UE) for allocating resource, the UE comprising: a transceiver; and a controller configured to control the transceiver to transmit and receive a signal, identify at least one sidelink logical channel not previously selected for a first sidelink control (SC) period and a second SC period, wherein the second SC period is overlapping in time with the first SC period, and allocate resource to the at least one sidelink logical channel.

Advantageous Effects

According to the present disclosure, a user equipment (UE) is capable of performing logical channel prioritization efficiently in D2D communication system.

Other aspects, advantages, and salient features of the disclosure will become apparent to those skilled in the art from the following detailed description, which, taken in conjunction with the annexed drawings, discloses various embodiments of the present disclosure.

DESCRIPTION OF DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Device to Device (D2D), vehicle to vehicle (V2V), vehicle to pedestrian (V2P) and pedestrian to vehicle (P2V) communication is being studied in communication standard groups to enable data communication services between the user equipment (UE), between the vehicular UE (V-UE), between the V-UE and pedestrian UE (P-UE).

During the D2D/V2V/V2P/P2V communication a transmitting UE can transmit data packets to a group of UEs or broadcast data packets to all the UEs or send unicast data packets to a specific UE. UE can be one of D2D UE, V-UE or P-UE. D2D/V2V/V2P/P2V communication between the transmitter and receiver(s) is connectionless in nature i.e. there is no connection setup (or no control messages are exchanged) between the transmitter and receiver before the transmitter starts transmitting the data packets.

During the transmission, the transmitter includes the source identifier (Source ID) and the destination identifier (Destination ID) in the header of PDU carrying data packets. The Source ID is set to the UE ID of the transmitter. The Destination ID is the identifier of the intended recipient of the transmitted packet. The Destination ID indicates whether the packet is a broadcast packet or a unicast packet or a packet intended for a group. The Destination ID is set to broadcast group identifier in a broadcast packet. The Destination ID is set to group identifier of intended group in a group cast packet. The Destination ID is set to UE ID in a unicast packet.

Packet received from higher layer (e.g. application layer) is processed by PDCP (packet data convergence protocol) layer, RLC (radio link control) layer and MAC (medium access control) Layer. Each packet for transmission is associated with Source ID, Destination ID and priority. Packet with distinct {Source ID, Destination ID, Priority} is mapped to different PDCP entity, RLC entity and logical channel (also referred as sidelink logical channel). If one of Source ID, Destination ID or priority is different for a packet then packet is mapped to different PDCP entity, RLC entity and logical channel. Logical channel identifier (LCID) identifies a logical channel. LCIDs are maintained per Source ID and Destination ID pair which means that LCID value of logical channel for a {Source ID, Destination ID} pair can be same as logical channel for another {Source ID, Destination ID} pair. Logical channel can be uniquely identified by {Source ID, Destination ID, LCID}.

UE performs D2D/V2V/V2P/P2V communication on subframes (or time slots or transmit time intervals) defined over the duration of Sidelink Control period (referred as SC period). The SC period is the period over which resources allocated in a cell for Sidelink control information (referred as SCI) and or Sidelink data transmissions occur. Within the SC period the UE sends SCI followed by Sidelink data. SCI indicates a Layer 1 ID and characteristics of the transmissions (e.g. MCS, location of the resource(s) over the duration of Sidelink Control period, timing alignment).

Figure 1:
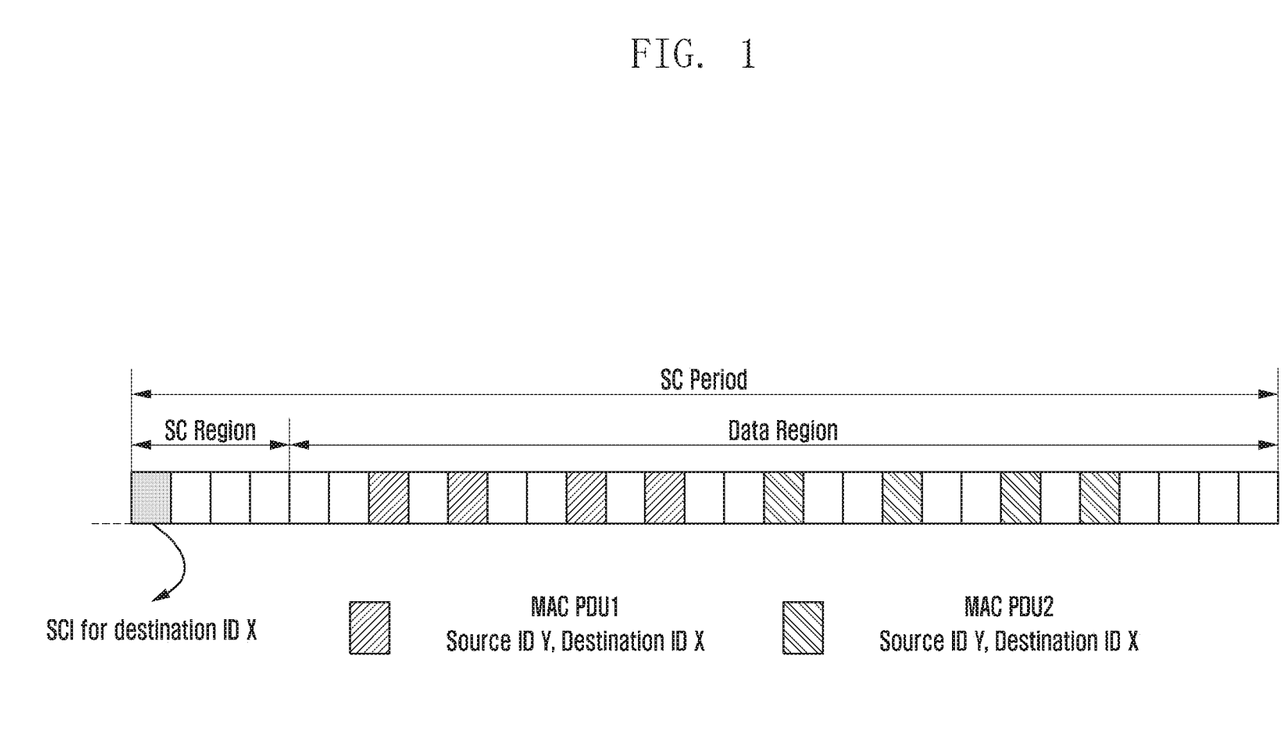
FIG. 1 illustrates an example where a user equipment (UE) transmits two MAC PDUs to in a sidelink control (SC) period.

For a SCI transmitted in SC period UE can transmit one or more new MAC (medium access control) PDU (protocol data units in that SC period. Each new MAC PDU is repeated fixed number of times in that SC period. Each new MAC PDU is transmitted after completion of all repeated transmission of previous MAC PDU in that SC period. UE can transmit multiple sidelink control information in one SC period. All MAC PDUs transmitted in SC period corresponding to an SCI carries MAC SDUs of one or more logical channels associated with same Source ID and Destination ID, FIG. 1 illustrates an example where a user equipment (UE) transmits two MAC PDUs in a sidelink control (SC) period. As shown in FIG. 1, the UE with Source ID Y transmits two MAC PDUs (MAC PDU 1 and MAC PDU 2) to Destination ID X. Each MAC PDU is transmitted four times, All MAC PDUs (MAC PDU 1 and MAC PDU 2) correspond to same Source ID and Destination ID pair (i.e. Source ID Y and Destination ID X).

There can be more than one logical channel having data available for transmission in the UE. The logical channel is considered to have data available for transmission if there is some pending data for transmission in buffer of that logical channel. The UE has to perform logical channel prioritization for generating MAC PDU. In the prior art, the MAC entity in LIE performs the following Logical Channel Prioritization procedure for each SCI transmitted in an SC period as follows:

The MAC entity allocates resources to the sidelink logical channels in the following steps:

a Step 0: Select a Destination, not previously selected for this SC period, having the sidelink logical channel with the highest priority, among the sidelink logical channels having data available for transmission; All the logical channels which have pending data are considered as having data available for transmission. For each MAC PDU for this SCI, perform step 1 and step 2.

Step 1: Among the sidelink logical channels belonging to the selected Destination and having data available for transmission, allocate resources to the sidelink logical channel with the highest priority;

Step 2: if any resources remain, sidelink logical channels belonging to the Destination are served in decreasing order of priority until either the data for the sidelink logical channels) or the sidelink grant is exhausted, whichever comes first. Sidelink logical channels configured with equal priority are served equally.

The logical channel prioritization in prior art works under the following assumptions:
 UE transmits in only one SC period or non-overlapping SC periods
 UE has only one Source ID The issues in existing method of logical channel prioritization are explained below.

Figure 2:
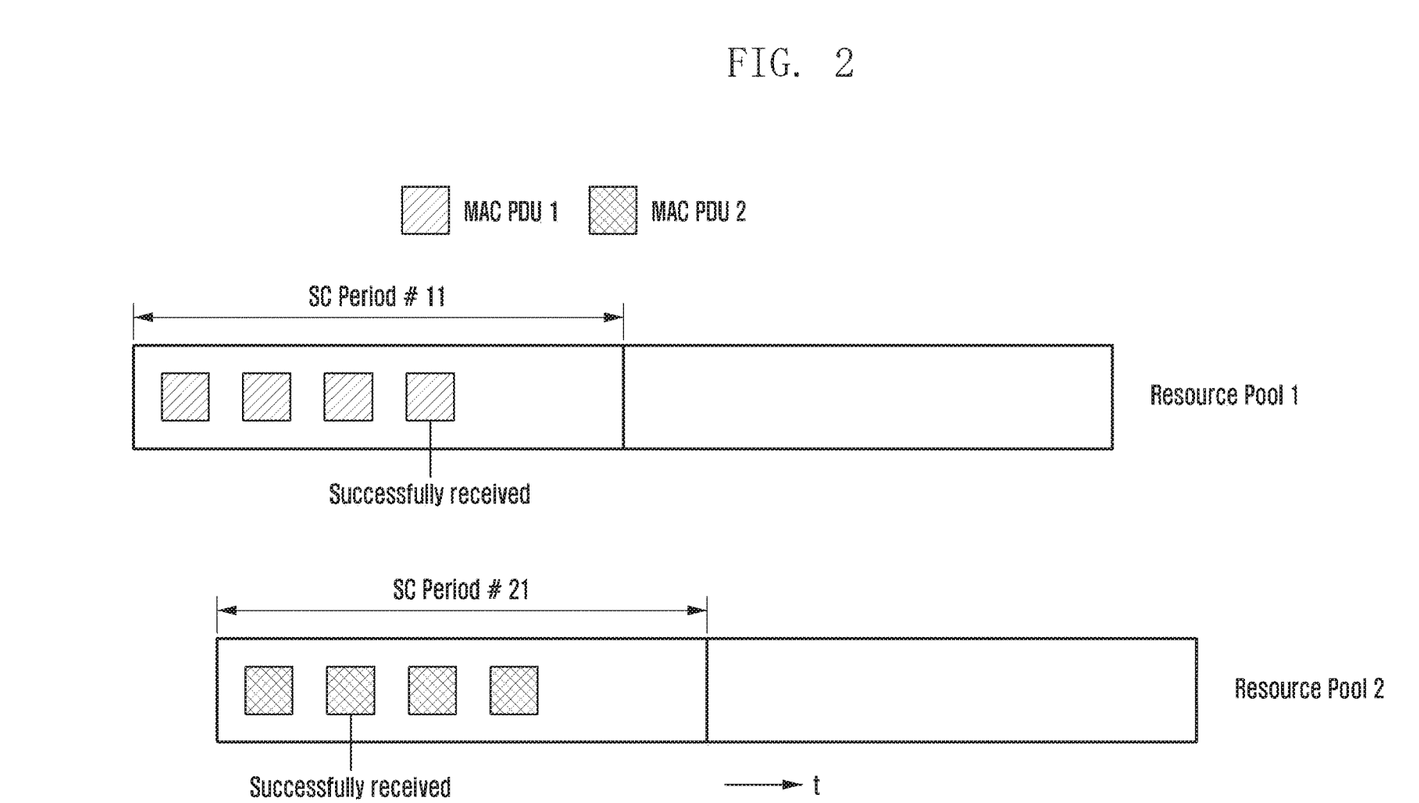
FIG. 2 illustrates an example where a UE transmits two MAC PDUs in two overlapping SC periods.

Issue 1:
FIG. 2 illustrates an example where a UE transmits two MAC PDUs in two overlapping SC periods. Assume that the UE is configured with two resource pools (pool-1 and pool-2) as illustrated in FIG. 2. The SC period#11 of pool-1 is overlapping with the SC period#21 of pool-2.

UE transmits two MAC PDUs in the two overlapping SC periods (SC period#11 and SC period#21). The MAC PDUs are retransmitted for 3 times, so that the number of transmission for each MAC PDU is 4.

As shown in FIG. 2, MAC PDU#1 is transmitted before the transmission of MAC PDU#2. However, due to retransmissions, MAC PDU#2 could be received successfully before the successful reception of MAC PD#1 at the receiver.

If the MAC PDU #1 and MAC PDU #2 carry the MAC SDU (service data units of same logical channel, then at the receiver side, the RLC PDUs delivered to a RLC entity corresponding to that logical channel could be out of sequence. Because in D2D/V2V/V2P/P2V communication, RLC layer has no functionality for reordering, the delivery of out-of-sequence RLC PDUs from the MAC layer should not be allowed.

Issue 2:
If UE transmits multiple SCI in same SC period of a resource pool, then for an SCI, UE excludes the destination previously selected for the SC period. The intention of excluding the destination was to avoid out of order issue at the receiver. However, this unnecessarily excludes all logical channels for the destination, even those which are not yet served for the SC period.

For example, UE transmits multiple SCI (e.g. SCI 1 and SCI 2) in a SC period. UE has data available for multiple destinations (e.g. Destination ID 1, Destination ID 2), There are two logical channels for Destination ID 1: LC 1 (P1), LC2 (P2). There are two logical channels for Destination ID 2: LCI (P3), LC2 (P4). The priority of logical channels are such that P1>P2>P3>P4. UE selects the logical channels for SCI 1 and 2 as follows:

[SCI 1: Select Destination ID 1]
 According to step 0 of LCP (logical channel prioritization procedure) in prior art, destination identified by destination ID1 is selected, as the sidelink logical channel of this destination has the highest priority, among all the sidelink logical channels having data available for transmission
 As a result, data from Logical channel 1 is included in grant

[SCI 2: Selected Destination ID 2.1]
 According to step 0 of LCP, destination identified by destination ID2 is selected, as it is not previously selected for this SC period. Destination identified by destination ID 1 is not selected as it is already selected for SCI 1 in same SC period.

The issue with this procedure is that high priority logical channels i.e. LC2 of destination identified by Destination ID 1 which is not yet served is also excluded.

Issue 3:
UE has two source IDs (SourceID1, Source ID2). UE has packets for transmission to a destination with Destination ID1. UE has four logical channels,
 Logical channel 1: Source ID1, Destination ID1, priority 1
 Logical channel 2: Source ID1, Destination ID1, priority 3
 Logical channel 3: Source ID2, Destination ID1, priority 2
 Logical channel 4: Source ID2, Destination ID1, priority 4

UE has resources for transmitting two new MAC PDUs. According to step 2 and step 3 of LCP in prior art, UE has to schedule logical channel 1, then logical channel 3, then logical channel 2 and then logical channel 4. After serving logical channel 1 if there is space in MAC PDU then it will go vacant as logical channel 3 cannot be scheduled as its source ID is different from that of logical channel 1 and only one source ID can be included in MAC PDU. Logical channel 3 cannot be served as it has low priority. This is not efficient method as leads to wastage of resources.

So, the logical channel prioritization method needs to be enhanced to overcome the issues mentioned above.

Embodiment 1

Figure 3A:
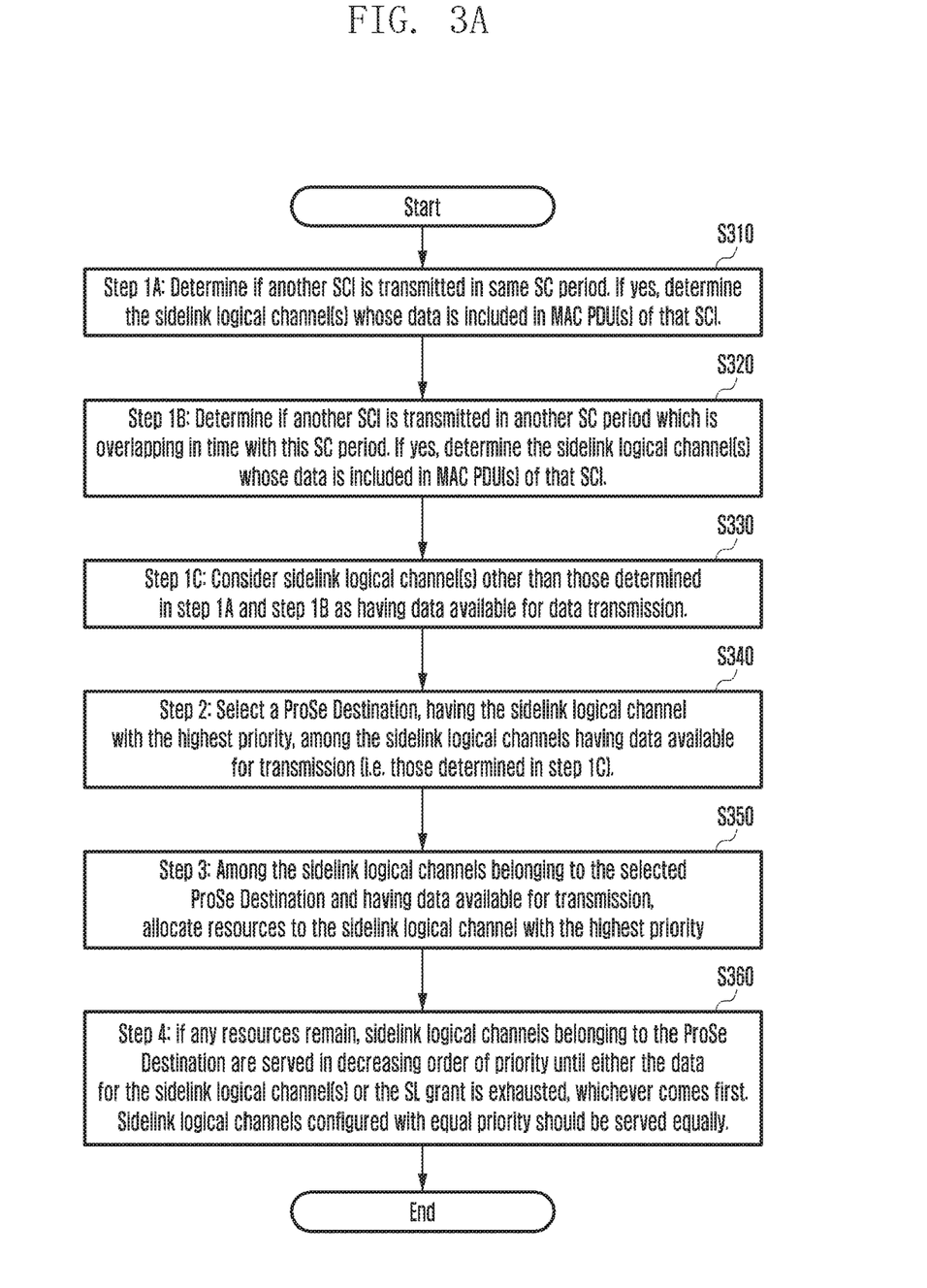
FIG. 3A illustrates a logical channel prioritization procedure of a UE according to an embodiment of the present invention.

FIG. 3A illustrates a logical channel prioritization procedure of a UE according to an embodiment of the present invention. UE performs this operation for each SCI transmitted in an SC period. This operation overcomes the issue 1 and issue 2 explained earlier. This operation can be performed in a MAC entity of UE.

The UE (or MAC entity in HE) shall allocate resources to the sidelink logical channels in the following steps:

Step 1 (S310~S330): only considers the sidelink logical channels not previously selected for this SC period and the SC periods (if any) which are overlapping with this SC period, to have data available for transmission. Note that amongst all the logical channels that have data available for transmission, logical channels which are already served/ selected for this SC period, logical channels which are already served/selected for SC periods overlapping with this SC period are excluded. In an embodiment the step 1 can comprise of following sub-steps:

Step 1A (S310): Determine if another SCI is transmitted in same SC period. If yes, determine the sidelink logical channel(s) whose data is included in MAC PDU(s) of that SCI.

Step 1B (S320): Determine if another SCI is transmitted in another SC period which is overlapping in time with this SC period. If yes, determine the sidelink logical channel(s) whose data is included in MAC PDU(s) of that SCI.

Step 1C (S330): Consider sidelink logical channel(s) other than those determined in step 1A and step 1B as having data available for data transmission.

Step 2 (S340): Select a ProSe Destination, having the sidelink logical channel with the highest priority. among the sidelink logical channels having data available for transmission; Here the sidelink logical channels having data available for transmission refers to logical channels determined as having data available for transmission in step 1C.

OR (Alternate) Select a ProSe Destination, not previously selected for this SC period, having the sidelink logical channel with the highest priority, among the sidelink logical channels having data available for transmission; Here the sidelink logical channels having data available for transmission refers to logical channels determined as having data available for transmission in step 1 (i.e. in step 1C).

Step 3 (S350): Among the sidelink logical channels belonging to the selected ProSe Destination and having data available for transmission; allocate resources to the sidelink logical channel with the highest priority;

Step 4 (S360): if any resources remain, sidelink logical channels belonging to the ProSe Destination (i.e. destination determined in step 2) are served in decreasing order of priority until either the data for the sidelink logical channel(s) or the sidelink grant is exhausted, whichever comes first. Sidelink logical channels configured with equal priority should be served equally.

Note that step 3/4 is repeated for each MAC PDU transmitted for the SCI. In an embodiment of the proposed invention step 1 is only applied for SCI transmitted in transmission mode 1 or mode 2. Transmission mode 1 refers to scheduled (eNB controlled) sidelink transmission using dedicated resources scheduled by eNB for sidelink communication. Transmission mode 2 refers to autonomous sidelink transmission using common resources for sidelink communication.

Figure 3B:
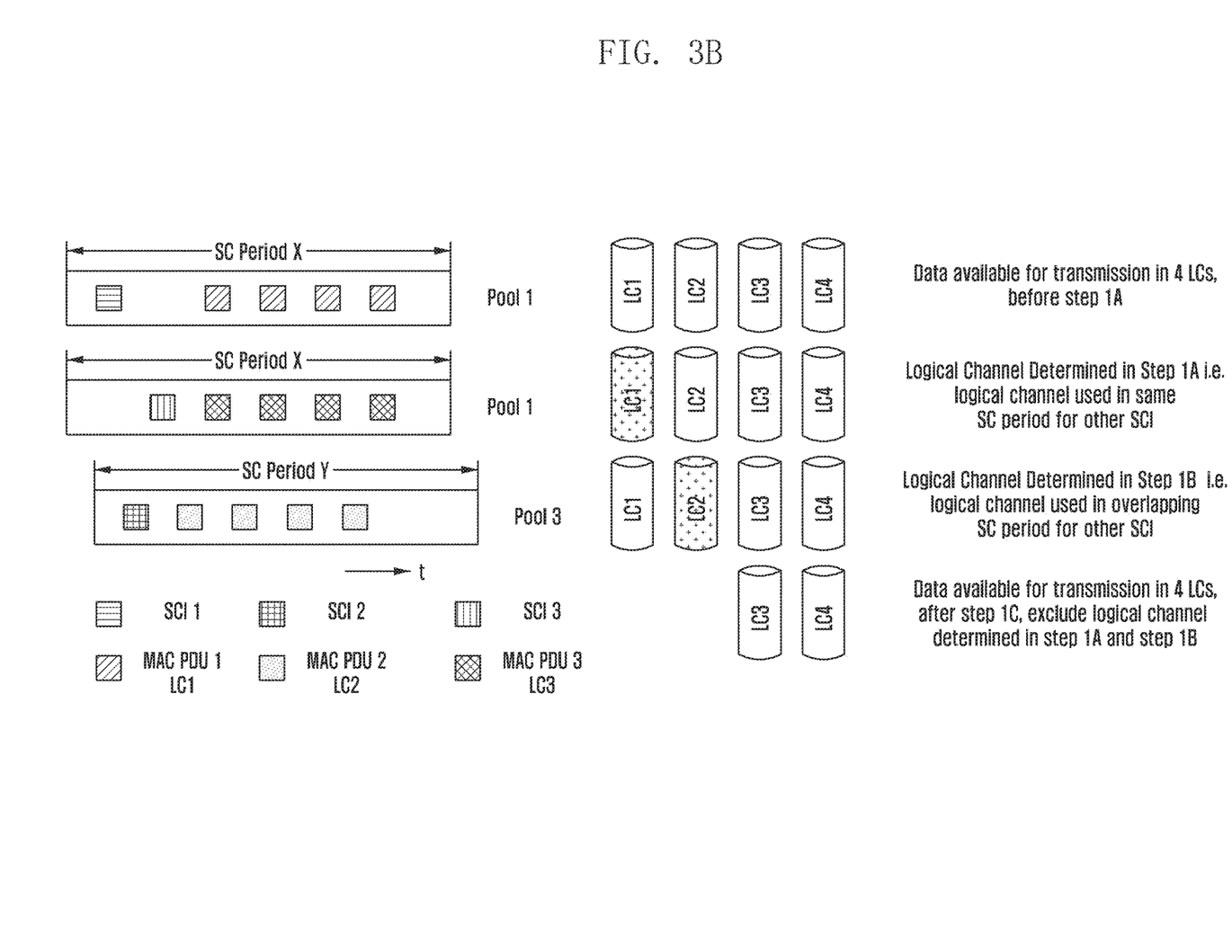
FIG. 3B is an example illustration of the operation of step 1 in the proposed logical channel prioritization procedure.

FIG. 3B is an example illustration of the operation of step 1 in the proposed logical channel prioritization procedure.

SCI 1 is transmitted in SC period X of resource pool 1. The MAC PDU(s) corresponding to this SCI carry MAC SDU(s) of logical channel 1. SCI 2 is transmitted in SC period Y of resource pool 2. The MAC PDU(s) corresponding to this SCI carry MAC SDU(s) of logical channel 2. SCI 3 is transmitted in SC period X of resource pool 1. In this example, operation of step 1 for transmitting SCI 3 in SC period X is explained. At the beginning of Step 1 i.e. before step 1A, data is available for transmission in 4 logical channels, LC1, LC2, LC3 and LC4. At step 1A, UE determines that another SCI i.e. SCI 1 is transmitted in same SC period and data from logical channel 1 is included in MAC PDU(s) of SCI 1. At step 1B, UE determines that another SCI 2 is transmitted in an overlapping SC period and data from logical channel 2 is included in MAC PDU(s) of SCI 2. At step 1C, UE excludes logical channel 1 and logical channel 2 and considers logical channel 3 and logical channel 4 as data available for transmission. The remaining steps (i.e. step 2 to 4) are then executed over these logical channels.

A MAC entity in the UE performs a logical channel prioritization procedure for each SCI.

In one embodiment of the proposed invention, there is a method for allocating resource by a user equipment (UE), the method comprising: identifying at least one sidelink logical channel not previously selected for a first sidelink control (SC) period and a second SC period, wherein the second SC period is overlapping in time with the first SC period, and allocating resource to the at least one sidelink logical channel.

The allocating resource to the at least one sidelink logical channel may comprise: selecting a ProSe destination, having a sidelink logical channel with the highest priority, among the at least one sidelink logical channel.

The method for allocating resource by the UE may comprise: identifying whether another sidelink control information (SCI) is transmitted in the first SC period, and determining first sidelink logical channel whose data is included in a medium access control (MAC) protocol data unit (PDU) of the another SCI, if the another SCI is transmitted in the first SC period.

The method for allocating resource by the UE may comprise: identifying whether another sidelink control information (SCI) is transmitted in the second SC period, and determining second sidelink logical channel whose data is included in a medium access control (MAC) protocol data unit (PDU) of the another SCI, if the another SCI is transmitted in the second SC period.

In one embodiment of the proposed invention, the at least one sidelink logical channel has data available for transmission associated with a sidelink communication. In one embodiment of the proposed invention, the at least one sidelink logical channel is identified by at least one of source ID, destination ID, and logical channel identifier (LCID).

Embodiment 2

Figure 4:
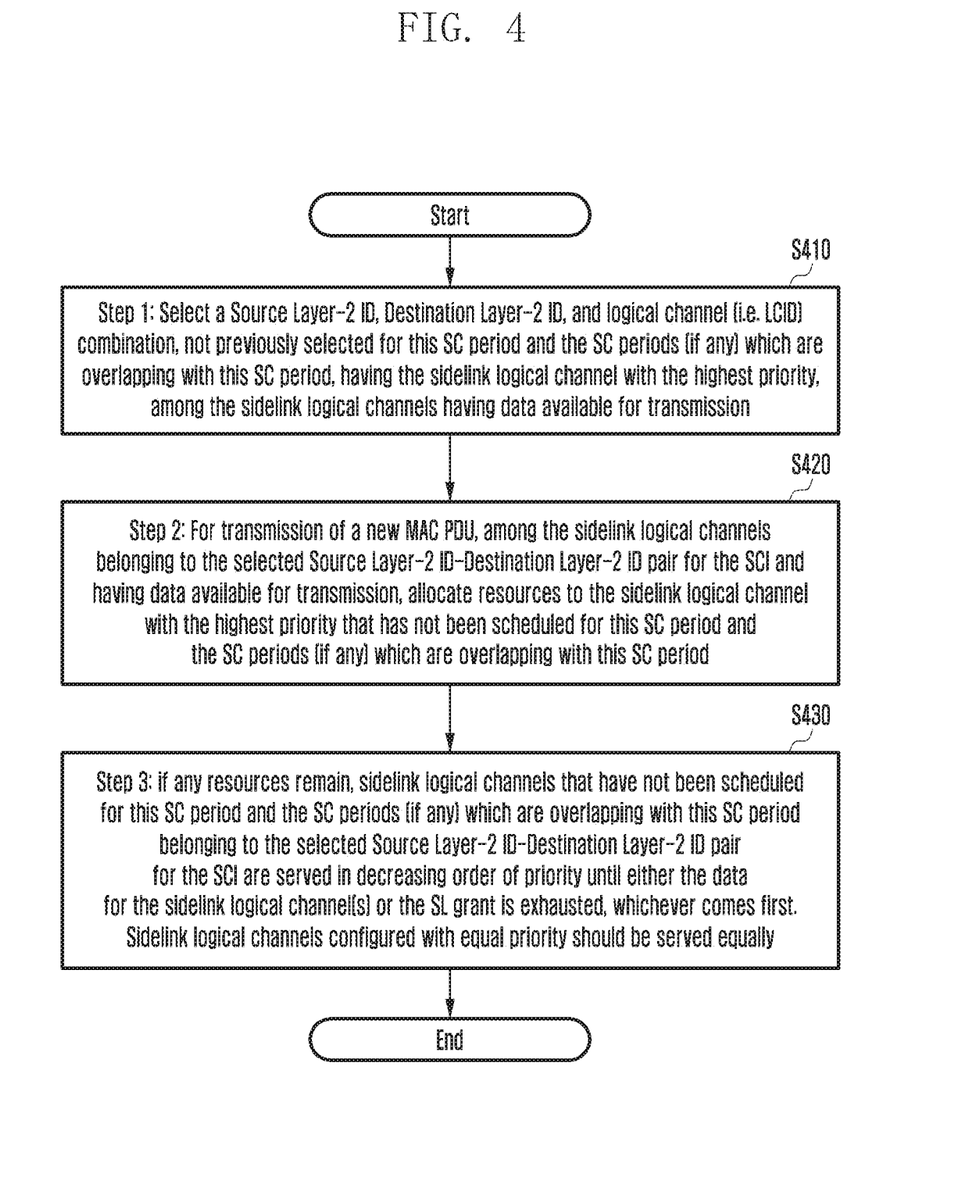
FIG. 4 illustrates a logical channel prioritization procedure of a UE according to another embodiment of the present invention.

FIG. 4 illustrates a logical channel prioritization procedure of a UE according to another embodiment of the present invention. UE performs this operation for each SCI transmitted in an SC period. This operation overcomes the issue 1 and issue 2 explained earlier. This operation can be performed in a MAC entity of UE. UE or (MAC entity in UE) shall allocate resources to the sidelink logical channels in the following steps:

Step 1 (S410): For a SCI transmission, select a Source Layer-2 ID, Destination Layer-2 ID, and logical channel (i.e. LCID) combination, not previously selected for this SC period and the SC periods (if any) which are overlapping with this SC period, having the sidelink logical channel with the highest priority, among the sidelink logical channels having data available for transmission;

Step 2 (S420): For transmission of a new MAC PDU, among the sidelink logical channels belonging to the selected Source Layer-2 ID-Destination Layer-2 ID pair for the SCI and having data available for transmission, allocate resources to the sidelink logical channel with the highest priority that has not been scheduled for this SC period and the SC periods (if any) which are overlapping with this SC period;

Step 3 (S430): if any resources remain, sidelink logical channels that have not been scheduled for this SC period and the SC periods (if any) which are overlapping with this SC period belonging to the selected Source Layer-2 ID-Destination Layer-2 ID pair for the SCI are served in decreasing order of priority until either the data for the sidelink logical channel(s) or the SL grant is exhausted, whichever comes first. Sidelink logical channels configured with equal priority should be served equally.

Embodiment 3

Figure 5:
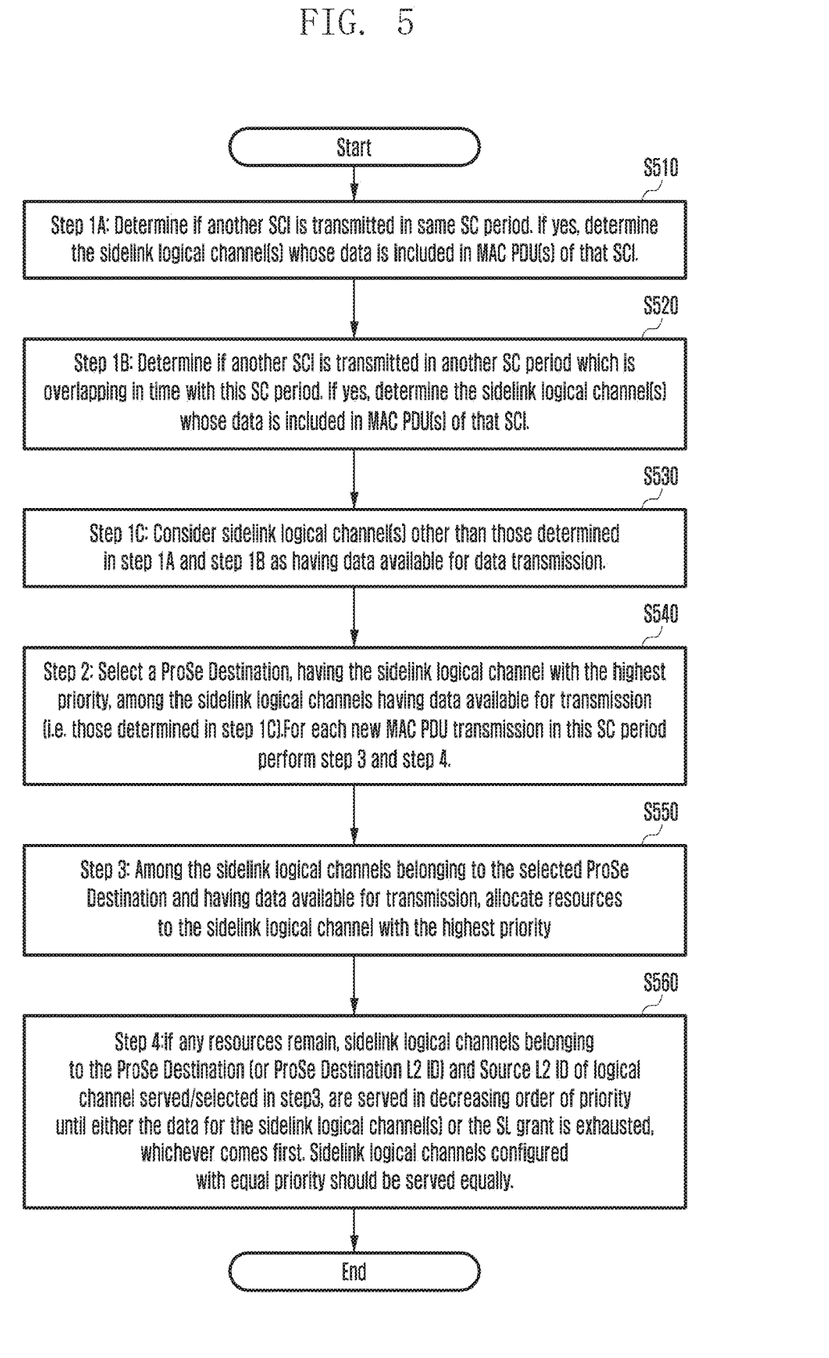
FIG. 5 illustrates a logical channel prioritization procedure of a UE according to the other embodiment of the present invention.

FIG. 5 illustrates a logical channel prioritization procedure of a UE according to the other embodiment of the present invention. UE performs this operation for each SCI transmitted in an SC period. This operation overcomes the issue 1, issue 2 and issue 3 explained earlier. This operation can be performed in a MAC entity of UE.

UE (or MAC entity in UE) shall allocate resources to the sidelink logical channels in the following steps:

Step 1 (S510~S530): Only consider the sidelink logical channels not previously selected for this SC period and the SC periods (if any) which are overlapping with this SC period, to have data available for transmission. In an embodiment the step 1 can comprise of following sub-steps:
  Step 1A (S510): Determine if another SCI is transmitted in same SC period. If yes, determine the sidelink logical channel(s) whose data is included in MAC PDU(s) of that SCI.
  Step 1B (S520): Determine if another SCI is transmitted in another SC period which is overlapping in time with this SC period. If yes, determine the sidelink logical channel(s) whose data is included in MAC PDU(s) of that SCI.
  Step 1C (S530): Consider sidelink logical channel(s) other than those determined in step 1A and step 1B as having data available for data transmission.

Step 2 (S540): Select a ProSe Destination, having the sidelink logical channel with the highest priority, among the sidelink logical channels having data available for transmission; Here the sidelink logical channels having data available for transmission refers to logical channels determined as having data available for transmission in step 1 (i.e. Step 1C).
  OR
  (Alternate) Select a ProSe Destination, not previously selected for this SC period, having the sidelink logical channel with the highest priority, among the sidelink logical channels having data available for transmission; Here the sidelink logical channels having data available for transmission refers to logical channels determined as having data available for transmission in step 1.

Step 3 (S550): Among the sidelink logical channels belonging to the selected ProSe Destination and having data available for transmission, allocate resources to the sidelink logical channel with the highest priority;

Step 4 (S560): if any resources remain, sidelink logical channels belonging to the ProSe Destination (or ProSe Destination L2 ID) and Source L2 ID of logical channel served/selected in step 3, are served in decreasing order of priority until either the data for the sidelink logical channel (s) or the SL grant is exhausted, whichever comes first. Sidelink logical channels configured with equal priority should be served equally.

Note that step 3/4 is repeated for each MAC PDU transmitted for a SCI. In an embodiment of the proposed invention step 1 is only applied for SCI transmitted in transmission mode 1 or mode 2. Transmission mode 1 refers to scheduled (eNB controlled) sidelink transmission using dedicated resources scheduled by eNB for sidelink communication. Transmission mode 2 refers to autonomous sidelink transmission using common resources for sidelink communication.

Figure 6:
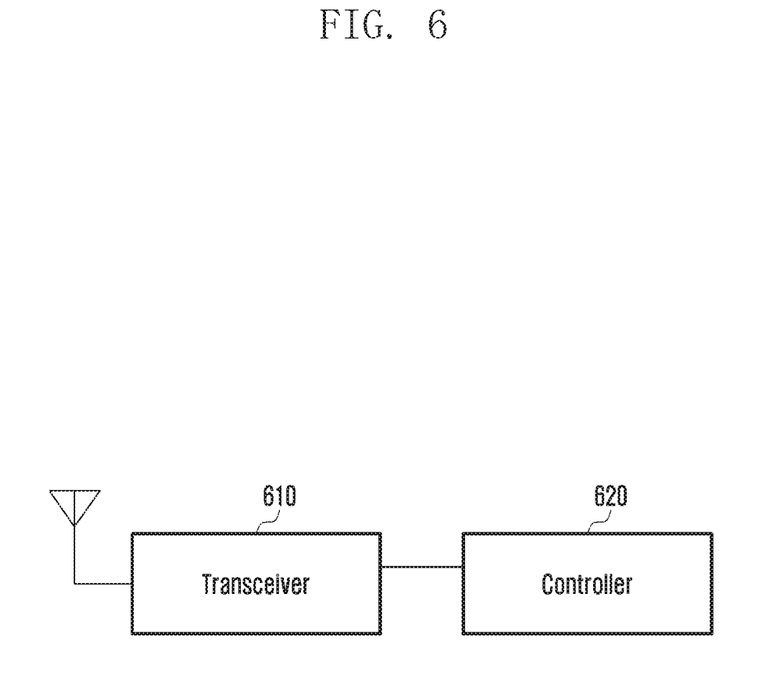
FIG. 6 illustrates a block diagram of a UE according to an embodiment of the present invention.

FIG. 6 illustrates a block diagram of a UE according to an embodiment of the present invention. The UE for allocating resource comprises a transceiver 610 and a controller 620. The controller 620 is configured to control the transceiver to transmit and receive a signal, identify at least one sidelink logical channel not previously selected for a first sidelink control (SC) period and a second SC period, wherein the second SC period is overlapping in time with the first SC period, and allocate resource to the at least one sidelink logical channel.

The controller is further configured to identify whether another sidelink control information (SCI) is transmitted in the first SC period, and determine first sidelink logical channel whose data is included in a medium access control (MAC) protocol data unit (PDU) of the another SCI., if the another SCI is transmitted in the first SC period.

The controller is further configured to identify whether another SCI is transmitted in the second SC period, and determine second sidelink logical channel whose data is included in a MAC PDU of the another SCI, if the another SCI is transmitted in the second SC period.

The controller is further configured to select a ProSe destination, having a sidelink logical channel with the highest priority, among the at least one sidelink logical channel.

The at least one sidelink logical channel has data available for transmission associated with a sidelink communication. A MAC entity in the UE performs a logical channel prioritization procedure for each SCI. The at least one sidelink logical channel is identified by at least one of source ID, destination ID, and logical channel identifier (LCID).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A method for allocating resources by a user equipment (UE), the method comprising:
  identifying one or more first sidelink logical channels selected for transmission in a first sidelink control (SC) period;
  identifying one or more second sidelink logical channels selected for transmission in a second SC period overlapping in time with the first SC period;
  identifying one or more sidelink logical channels for transmission in the first SC period by excluding the identified one or more first sidelink logical channels, excluding the identified one or more second sidelink logical channels, and including other sidelink logical channels having data available for transmission;
  identifying a sidelink logical channel with the highest priority among the one or more sidelink logical channels identified for transmission in the first SC period;
  selecting a destination corresponding to the sidelink logical channel with the highest priority; and
  allocating resources to sidelink logical channels belonging to the selected destination based on an order of a priority.
2. The method of claim 1, wherein the one or more first sidelink logical channels selected for transmission in the first SC period are one or more logical channels whose data are included in one or more medium access control (MAC) protocol data unitls (PDUs) transmitted in the first SC period.

3. The method of claim 1, wherein the one or more first sidelink logical channels selected for transmission in the second SC period are one or more logical channels whose data are included in one or more medium access control (MAC) protocol data unitls (PDUs) transmitted in the second SC period.

4. The method of claim 1, wherein the allocating the resources further comprises:
among the sidelink logical channels belonging to the selected destination and having data available for transmission, allocating the resources to the sidelink logical channel with a highest priority; and
if any resources remain, serving sidelink logical channels belonging to the destination in decreasing order of the priority until either data for the sidelink logical channels or a sidelink grant is exhausted, whichever comes first, wherein the sidelink logical channels configured with an equal priority are served equally.

5. A user equipment (UE) for allocating resources, the UE comprising:
a transceiver; and
a controller coupled with the transceiver and configured to control to:
identify one or more first sidelink logical channels selected for transmission in a first sidelink control (SC) period,
identify one or more second sidelink logical channels selected for transmission in a second SC period overlapping in time with the first SC period,
identify one or more sidelink logical channels for transmission in the first SC period by excluding the identified one or more first sidelink logical channels, excluding the identified one or more second sidelink logical channels, and including other sidelink logical channels having data available for transmission,
identify a sidelink logical channel with the highest priority among the one or more sidelink logical channels identified for transmission in the first SC period,
select a destination corresponding to the sidelink logical channel with the highest priority, and
allocate resources to sidelink logical channels belonging to the selected destination based on an order of a priority.

6. The UE of claim 5, wherein the one or more first sidelink logical channels selected for transmission in the first SC period are one or more logical channels whose data are included in one or more medium access control (MAC) protocol data unitls (PDUs) transmitted in the first SC period.

7. The UE of claim 5, wherein the one or more second sidelink logical channels selected for transmission in the second SC period are one or more logical channels whose data are included in one or more medium access control (MAC) protocol data unitls (PDUs) transmitted in the second SC period.

8. The UE of claim 5, wherein the controller is further configured to:
allocate the resources to the sidelink logical channel with a highest priority among the sidelink logical channels belonging to the selected destination and having data available for transmission; and
if any resources remain, serve sidelink logical channels belonging to the destination in decreasing order of the priority until either data for the sidelink logical channels or a sidelink grant is exhausted, whichever comes first, wherein the sidelink logical channels configured with an equal priority are served equally.

* * * * *